United States Patent
Agarwal et al.

(10) Patent No.: US 12,386,748 B2
(45) Date of Patent: Aug. 12, 2025

(54) SELECTIVE FILL FOR LOGICAL CONTROL OVER HARDWARE MULTILEVEL MEMORY

(71) Applicant: Intel Corporation, Santa Clara, CA (US)

(72) Inventors: Rajat Agarwal, Portland, OR (US); Sai Prashanth Muralidhara, Portland, OR (US); Wei P. Chen, Portland, OR (US); Nishant Singh, Bengaluru (IN); Sharada Venkateswaran, San Francisco, CA (US); Daniel W. Liu, Concord, CA (US)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 17/710,806

(22) Filed: Mar. 31, 2022

(65) Prior Publication Data

US 2022/0222178 A1     Jul. 14, 2022

(51) Int. Cl.
*G06F 12/0811*     (2016.01)
*G06F 12/0815*     (2016.01)

(52) U.S. Cl.
CPC ...... *G06F 12/0811* (2013.01); *G06F 12/0815* (2013.01); *G06F 2212/62* (2013.01)

(58) Field of Classification Search
CPC ............. G06F 12/0811; G06F 12/0815; G06F 2212/62
See application file for complete search history.

(56) References Cited

U.S. PATENT DOCUMENTS

| | | | |
|---|---|---|---|
| 5,594,883 | A | 1/1997 | Pricer |
| 9,990,301 | B1 * | 6/2018 | Kanaujia ............. G06F 12/0891 |
| 2002/0083274 | A1 | 6/2002 | Gharachorloo et al. |
| 2013/0091331 | A1 | 4/2013 | Moraru et al. |
| 2016/0062660 | A1 | 3/2016 | Kunimatsu et al. |
| 2017/0185315 | A1 | 6/2017 | Geetha et al. |
| 2018/0129424 | A1 | 5/2018 | Confalonieri et al. |
| 2018/0165207 | A1 | 6/2018 | Yigzaw et al. |
| 2019/0095332 | A1 | 3/2019 | Wang et al. |
| 2019/0220406 | A1 | 7/2019 | Ramanujan et al. |
| 2019/0243788 | A1 | 8/2019 | Stonelake et al. |

(Continued)

FOREIGN PATENT DOCUMENTS

WO     1984002017 A1     5/1984

OTHER PUBLICATIONS

Chou et al., "Cameo: A Two-Level Memory Organization with Capacity of Main Memory and Flexibility of Hardware-Managed Cache," 2014 47th Annual IEEE/ACM International Symposium on Microarchitecture, Dec. 13-17, 2014, 12 pages.

(Continued)

*Primary Examiner* — Prasith Thammavong
(74) *Attorney, Agent, or Firm* — Compass IP Law PC

(57) ABSTRACT

A system includes a multilevel memory such as a two level memory (2LM), where a first level memory acts as a cache for the second level memory. A memory controller or cache controller can detect a cache miss in the first level memory for a request for data. Instead of automatically performing a swap, the controller can determine whether to perform a swap based on a swap policy assigned to a memory region associated with the address of the requested data.

20 Claims, 6 Drawing Sheets

(56) References Cited

U.S. PATENT DOCUMENTS

| | | |
|---|---|---|
| 2019/0258583 A1 | 8/2019 | Chittor et al. |
| 2020/0356482 A1 | 11/2020 | Geetha et al. |
| 2021/0056035 A1 | 2/2021 | Ramanujan et al. |
| 2021/0173777 A1 | 6/2021 | Zhang et al. |
| 2021/0216452 A1 | 7/2021 | Muralidhara et al. |
| 2021/0286555 A1 | 9/2021 | Li |
| 2022/0156202 A1* | 5/2022 | Koker ................ G06T 1/60 |
| 2023/0056500 A1* | 2/2023 | Estep ................ G06F 9/526 |
| 2023/0109344 A1* | 4/2023 | Kelley ............ G06F 11/3037 |
| | | 714/30 |

OTHER PUBLICATIONS

Oksin et al., "A Software-Managed Approach to Die-Stacked DRAM," 2015 International Conference on Parallel Architecture and Compilation (PACT), San Francisco, CA, Oct. 18-21, 2015, 13 pages.

Ryoo et al., "i-MIRROR: A Software Managed Die-Stacked DRAM-Based Memory Subsystem," 2015 27th International Symposium on Computer Architecture and High Performance Computing, Oct. 17-21, 2015, 8 pages.

Sim et al., "Transparent Hardware Management of Stacked DRAM as Part of Memory," 2014 47th Annual IEEE/ACM International Symposium on Microarchitecture, Cambridge, Dec. 13-17, 2014, 12 pages.

First Office Action for U.S. Appl. No. 17/214,818, Mailed May 1, 2024, 11 pages.

Dutch and English Translation of Search Report and Written Opinion for Patent Application No. 2030989, Mailed Mar. 27, 2023, 15 pages.

Final Office Action for U.S. Appl. No. 17/214,818, Mailed Aug. 19, 2024, 13 pages.

\* cited by examiner

SELECTIVE FILL FOR LOGICAL CONTROL OVER HARDWARE MULTILEVEL MEMORY

FIELD

Descriptions are generally related to memory systems, and more particular descriptions are related to multilevel memory systems.

BACKGROUND

Main system memory or the operating memory for the compute resources of a computing device can include memory resources having different access latencies. The memory resources can be differentiated based on access latency. Depending on the system architecture, the main system memory can be implemented as a multiple level memory or two level memory (2LM) having a first memory level having faster access than a second level memory. The 2LM configuration can operate with the first level memory acting as a cache for the second level memory.

Some memory devices used for the second level memory have bandwidth that is significantly lower than the first level memory. In a typical implementation, when the controller detects a miss in the first level memory, it will perform a data swap (e.g., a cacheline swap) to bring the requested data into the first level memory. During steady state runtime, the first level memory will be essentially full, meaning that a cache miss will also require data to be written out (evicted) from the first level memory to make available address space for the data to be read in. The writing out of the data includes evicting dirty data out of the first level memory into the second level memory. Evicting the data can result in cache thrashing, which results in worse system performance.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
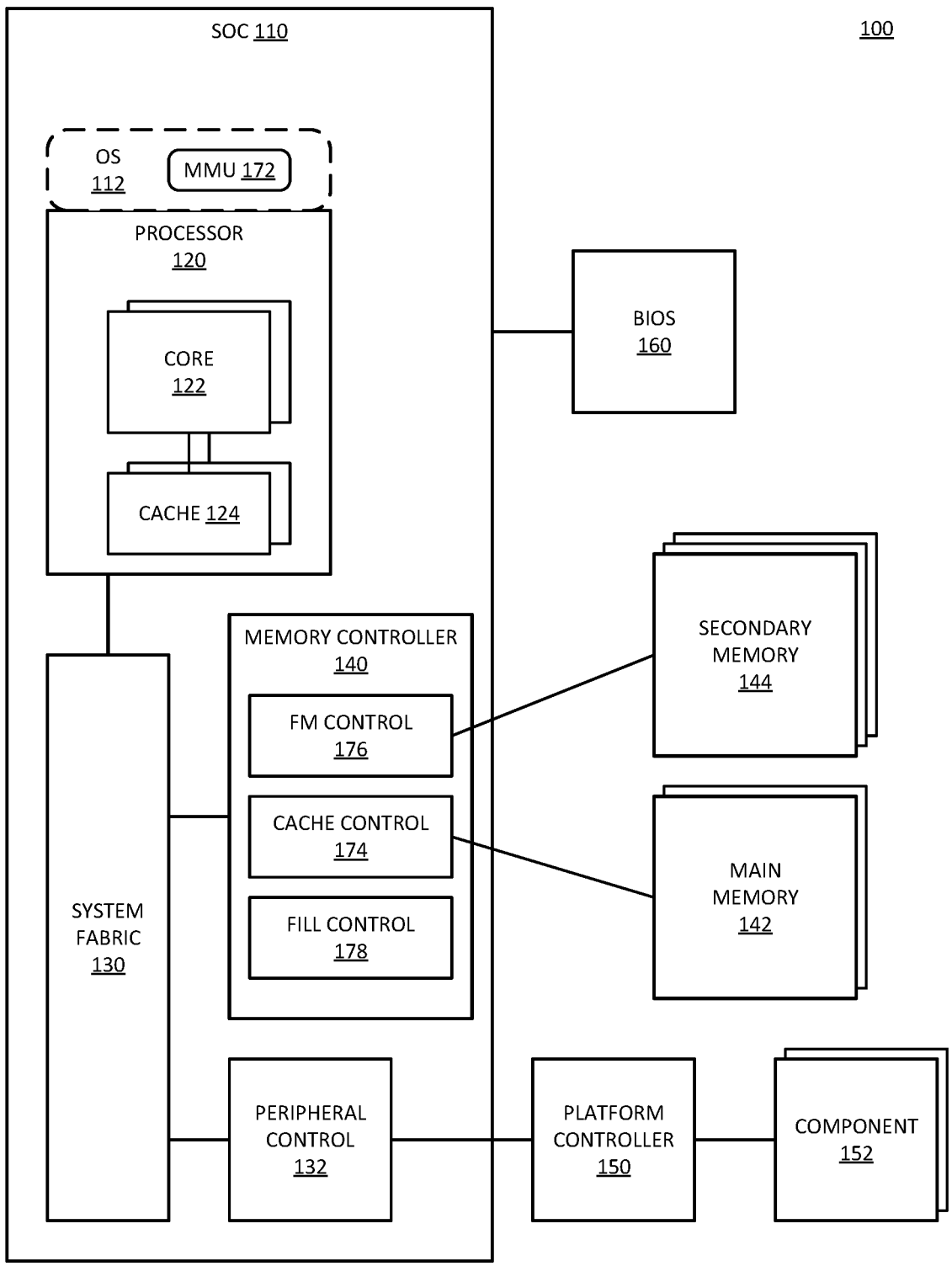
FIG. 1 is a block diagram of an example of a multilevel memory system.

Descriptions of certain details and implementations follow, including non-limiting descriptions of the figures, which may depict some or all examples, and well as other potential implementations.

DETAILED DESCRIPTION

As described herein, a system includes a multilevel memory such as a two level memory (2LM), where a first level memory acts as a cache for the second level memory. A memory controller or cache controller can detect a cache miss in the first level memory for a request for data (e.g., a cacheline or unit of memory). Instead of automatically performing a swap of data between the first level memory and the second level memory, the controller can determine whether to perform a swap based on a swap policy assigned to a memory region associated with the address of the requested data.

The swap policy can be referred to as a selective fill mechanism, referring to a mechanism in the system to selectively fill the first level memory with data from the second level memory. In contrast to a system that has a hard partition on the memory regions between 1LM (one level memory) and 2LM at boot time, a system can resize or change the allocation or partition of memory at runtime. In one example, when the system detects far memory bandwidth saturation, the system can adjust the rate of fill from the second level memory to the first level memory. Thus, in response to bandwidth saturation of the second level memory, the system can reduce the fill rate of the first level memory. In one example, in response to detection of the bandwidth saturation reducing, the system can adjust the selective fill to increase the rate of fill.

In one example, the system software, through one or more software modules or agents in the host operating system (OS), or executing as applications or processes under the host OS, can adjust the statistical fill/evict behavior of the 2LM system based on needs of the workloads executing on the system. The adjustment of the 2LM fill behavior can enable a system to dynamically respond to the performance needs of the workloads.

Hardware-based 2LM helps reduce memory costs while maintaining performance that is close to 1LM DRAM-only (only dynamic random access memory devices) memory for most workloads. Implementations of 2LM in server farm contexts, such as cloud service systems or datacenters, can encounter situations that reduce the performance gains of 2LM.

Certain workloads, which is typically only a subset of the total workloads executed in a system, are not "cache friendly" and may not perform as well in a 2LM configuration. If a CPU (central processing unit) memory region is partitioned into a 1LM region and a 2LM region, in one example, the system can limit the 2LM unfriendly workloads to be run in the 1LM region, without using the 2LM region. However, it is not always clear at dispatch or workload sharing what workloads are cache-unfriendly. Thus, a particular compute node could end up with one or many 2LM unfriendly workloads, with widely varied distribution of such workloads across nodes. Allowing the system software to dynamically control the size of the 1LM region and consequently the size of the remaining 2LM region allows the system to adapt to needs of different workloads.

It will be understood that while hardware-based or hardware-controlled 2LM has low system overhead, and it thus efficient, there are time that system software, such as the OS or an application in the system, can have information on specific cacheline or pages or data that cannot be inferred by hardware. The descriptions herein refer generally to a cacheline of data, which refers to a single unit of data for purposes of access to the memory, and a unit of data for swapping of data between the first memory level and the second memory level. Reference to cachelines will be understood to mean a unit of data for purposes of swapping or pinning, which can be a cacheline or other unit of data native to the memory architecture. The long-term or "inside" information on the use of specific data can enable the software to provide better data use than leaving all decisions up to hardware alone. In one example, the OS or an application can override the underlying hardware 2LM control over data, and place (or "pin") specific physical cachelines in faster memory (e.g., the first level memory, such as DRAM).

The system can have feedback-based dynamic fill/evict to improve 2LM performance for various workloads. In one example, the system can dynamically provide either 1LM or 2LM memory allocation for a workload. Thus, the software can dynamically assign cachelines between regions with 1LM or 2LM characteristics, allowing the system to adjust 2LM behavior to adapt to realtime workload needs. Allowing the software to dynamically assign cachelines for different memory allocation enables the software to choose the best cacheline allocation policy for the data.

FIG. 1 is a block diagram of an example of a multilevel memory system. System 100 includes SOC (system on a chip) 110, which represents an integrated processor package, which includes processor cores and integrated controllers. SOC 110 represents an example of a processor die or a processor SOC package. SOC 110 can represent a central processing unit (CPU), a graphics processing unit (GPU), or other processing device. SOC 110 can be part of a compute node of a group of server devices.

SOC 110 includes processor 120, which can include one or more cores 122 (i.e., a single core processor or a multicore processor) to perform the execution of instructions. In one example, cores 122 include cache 124, which represents cache resources on the processor side, and includes cache control circuits and cache data storage. Cache 124 can represent any type of cache on the processor side. In one example, individual cores 122 include a local cache 124 that is not shared with other cores. In one example, multiple cores 122 share one or more caches 124.

In one example, processor 120 represents compute resources on which a host operating system (OS) is executed. In a processor such as a graphics processor or accelerator, the processor does not necessarily execute the host OS, but can execute a control process to manage the device. OS 112 represents an operating system or program or agent executed by processor 120. In one example, OS 112 can generate information or hints in a data access request to direct how the hardware can manage the data in the system memory resources.

In one example, SOC 110 includes system fabric 130 to interconnect components of the processor system. System fabric 130 can be or include interconnections between processor 120 and peripheral control 132 and one or more memory controllers such as memory controller 140. System fabric 130 enables the exchange of data signals among the components of SOC 110. While system fabric 130 is generically shown connecting the components, it will be understood that system 100 does not necessarily illustrate all component interconnections. System fabric 130 can represent one or more mesh connections, a central switching mechanism, a ring connection, a hierarchy of fabrics, or other interconnection topology.

In one example, SOC 110 includes one or more peripheral controllers 132 to connect to peripheral components or devices that are external to SOC 110. In one example, peripheral control 132 represents hardware interfaces to platform controller 150, which includes one or more components or circuits to control interconnection in a hardware platform or motherboard of system 100 to interconnect peripherals to processor 120. Components 152 represent any type of chip or interface or hardware element that couples to processor 120 via platform controller 150.

System 100 includes BIOS (basic input output system) 160, which represents a boot controller for system 100. BIOS 160 can manage the bootup of system 100 until system configuration is verified and OS 112 can be executed. In one example, BIOS 160 verifies the capacity of memory resources available through main memory 142 and secondary memory 144. BIOS 160 can configure OS 112 or other application or software in system 100 with memory configuration information.

In one example, SOC 110 includes memory controller 140, which represents control logic to manage access to memory resources, including main memory 142 and secondary memory 144. In one example, memory controller 140 represents an integrated memory controller (iMC) implemented as hardware circuits and software/firmware control logic in SOC 110. Main memory 142 and secondary memory 144 represent different levels of system memory. While system 100 illustrates both as connecting to memory controller 140, SOC 110 can include separate controllers for different types of memory or different links to memory devices.

In one example, main memory 142 includes volatile memory, such as DRAM (dynamic random access memory). Volatile memory has indeterminate state if power is interrupted to the system. In one example, main memory 142 includes a double data rate (DDR) volatile memory device. In one example, secondary memory 144 includes nonvolatile memory (NVM) or persistent memory, which has determinate state even if power is interrupted to the system. There can be an overlap of memory types between main memory 142 and secondary memory 144. Whether it is due to the link or connection, due to the memory technology, or due to a combination of the two, secondary memory 144 has a longer access time than main memory 142.

In one example, secondary memory 144 includes a three dimensional crosspoint (3DXP) memory, such as a memory with cells based on a chalcogenide glass technology. A specific example of 3DXP includes an INTEL Optane memory, available from Intel Corporation. In one example, secondary memory 144 includes NVM coupled to SOC 110 over a peripheral connection, such as PCIe (peripheral connection interface express), NVMe (nonvolatile memory express), or CXL (compute express link).

PCIe can be in accordance with PCI Express Base Specification Revision 4.0, originally released in October 2017 by PCI-SIG, PCI Express Base Specification Revision 5.0, originally released in May 2019 by PCI-SIG, or variations. NVMe can be in accordance with NVMe Express Base Specification, originally released in June 2019 by NVM Express Inc., or a variation.

CXL can refer to a memory device connected with a CXL link in accordance with specification available from the Compute Express Link (CXL) Consortium, such as Compute Express Link Specification, Rev. 2.0, Ver. 1.0, published Oct. 26, 2020. Connection with a CXL link can allow for onlining and offlining memory resources, for example, for memory pooling or other exposing of memory address space from a shared resource.

In one example, reference to NVM media can refer to a block addressable memory device, such as NAND (not AND based gates) or NOR (not OR based gates) flash technologies. In one example, the NVM media can includes a future generation nonvolatile device, such as a three dimensional crosspoint memory device, other byte addressable or block addressable nonvolatile memory devices. In one example, the NVM media can include a nonvolatile media that stores data based on a resistive state of the memory cell, or a phase of the memory cell. In one example, the memory device can use chalcogenide phase change material (e.g., chalcogenide glass). In one example, the memory device can be or include multi-threshold level NAND flash memory, NOR flash memory, single or multi-level phase change memory (PCM) or phase change memory with a switch (PCMS), a resistive memory, nanowire memory, ferroelectric transistor random-access memory (FeTRAM), magnetoresistive random-access memory (MRAM) memory that incorporates memristor technology, or spin transfer torque (STT)-MRAM, or a combination of any of the above, or other memory.

Typically, secondary memory 144 has a higher capacity than main memory 142. The ratio of secondary memory 144 to main memory 142 will vary by system. Some implementations of system 100 can have a ratio of approximately 1:2 main memory to secondary memory. The ratio can be approximately 1:1, or can be higher, such as 1:4, 1:8, or other ratio of main memory to secondary memory. In one example, main memory 142 and secondary memory 144 can be configured for one of two different memory modes. In a first mode, the memory resources are used in a 1LM configuration or a flat memory, where memory controller 140 can use main memory 142 and secondary memory 144 as one contiguous system memory address range. In one example, memory controller 140 can use main memory 142 as a cache for secondary memory 144. In one example, the system can allocate portions of main memory 142 as a 1LM memory, and another portion as a cache for secondary memory 144.

In one example, OS 112 includes MMU (memory management unit) 172, which represents a memory management module of the operating system. MMU 172 can identify to OS processes and to applications executed under OS 112 what memory resources are available. In one example, MMU 172 can enable OS 112 to provide hints or direction for memory usage for a data access request.

In one example, system 100 includes separate controllers to manage access to main memory 142 and secondary memory 144. Memory controller 140 represents control for both levels of memory in system 100, with cache control 174 to manage access to main memory 142, and FM (far memory) control 176 to manage access to secondary memory 144. In one example, memory controller 140 includes a memory mapping to manage the address ranges associated with main memory 142 and secondary memory 144. In one example, data stored in main memory 142 and secondary memory 144 can be said to have a home address. A home address can refer to an address where the start of the data is. The home address can indicate which of the multiple devices of system memory holds the data. In one example, cache control 174 can evaluate each memory access request (e.g., Read or Write request) to determine if the home address is in main memory 142 to determine if there is a cache hit. In a 2LM configuration where main memory 142 is a cache or near memory cache (NM$), memory controller 140 first attempts access to main memory 142, followed by access to secondary memory 144 if there is a cache miss in main memory 142.

In one example, memory controller 140 includes fill control 178. Fill control 178 represents manage of dynamic fill and evict behavior for 2LM and 1LM in system 100. Fill control 178 can identify and respond to hints or feedback from software components with respect to memory access. As such, fill control 178 can enable memory controller 140 to adapt 2LM behavior to realtime workload characteristics.

In one example, fill control 178 can manage fill of main memory 142 as a near memory (NM) based on the bandwidth of access to secondary memory 144 as a far memory (FM). In one example, fill control 178 fills main memory 142 at a lower rate when the bandwidth of secondary memory 144 reaches a saturation point or a configured bandwidth. When the fill rate is reduced, memory controller 140 will access the requested data from secondary memory 144, but will not fill the data into main memory 142. A higher percentage of FM reads than writes can improve the overall FM bandwidth. Such an approach may increase read latency when there is a high miss rate, but the approach can also reduce the performance impact relative to saturating the FM bandwidth.

In general, in response to the triggering of one or more conditions, memory controller 140 will not bring a cacheline out of secondary memory 144 to main memory 142 in response to a cache miss in main memory 142. Cache control 174 can issue a fill read to secondary memory 144, returning the data to system fabric 130, and dropping the fill write into main memory 142. Thus, memory controller 140 can execute the read from secondary memory 144 without writing the data to main memory 142. Whatever data was already in main memory 142 will remain, without evicting a cacheline from main memory 142.

In one example, fill control 178 can enable multiple hardware controls over the fill to NM, which can be tunable. Tunable controls can refer to the ability to set different configuration parameters for how the controls will be applied. For example, the controls can be applied by memory region, by physical memory page, based on number of accesses to a cacheline or page, based on a number of access to a memory region, based on a number of misses, based on workloads being executed, or some other configuration. In one example, MMU 172 can provide configuration information to memory controller 140 for fill control 178 or cache control 174, or a combination of the two. In one example, MMU 172 can provide hints or parameters to memory controller 140 to prevent data from being swapped out of main memory 142 based on a prediction that the data will be needed again, even if a current request is for different data that will need to be accessed from secondary memory 144.

In one example, the request for data is a request for a page of data, and detecting the cache miss detects that the page is not in NM. In one example, the swap of data can be a page swap for the requested data. In one example, the request for data is a request for a cacheline, and detecting the cache miss detects that the cacheline is not in NM. In one example, the swap of data can be a cacheline swap for the requested data.

In one example, fill control 178 includes swap policy information for different regions of memory. In one example, the data request indicates a swap policy for the requested data. Based at least on the swap policy for the requested data or for the memory region associated with the requested data, cache control 174 and memory controller 140 can determine whether to perform a data swap between main memory 142 (the first level memory) and secondary memory 144 (the second level memory).

Figure 2:
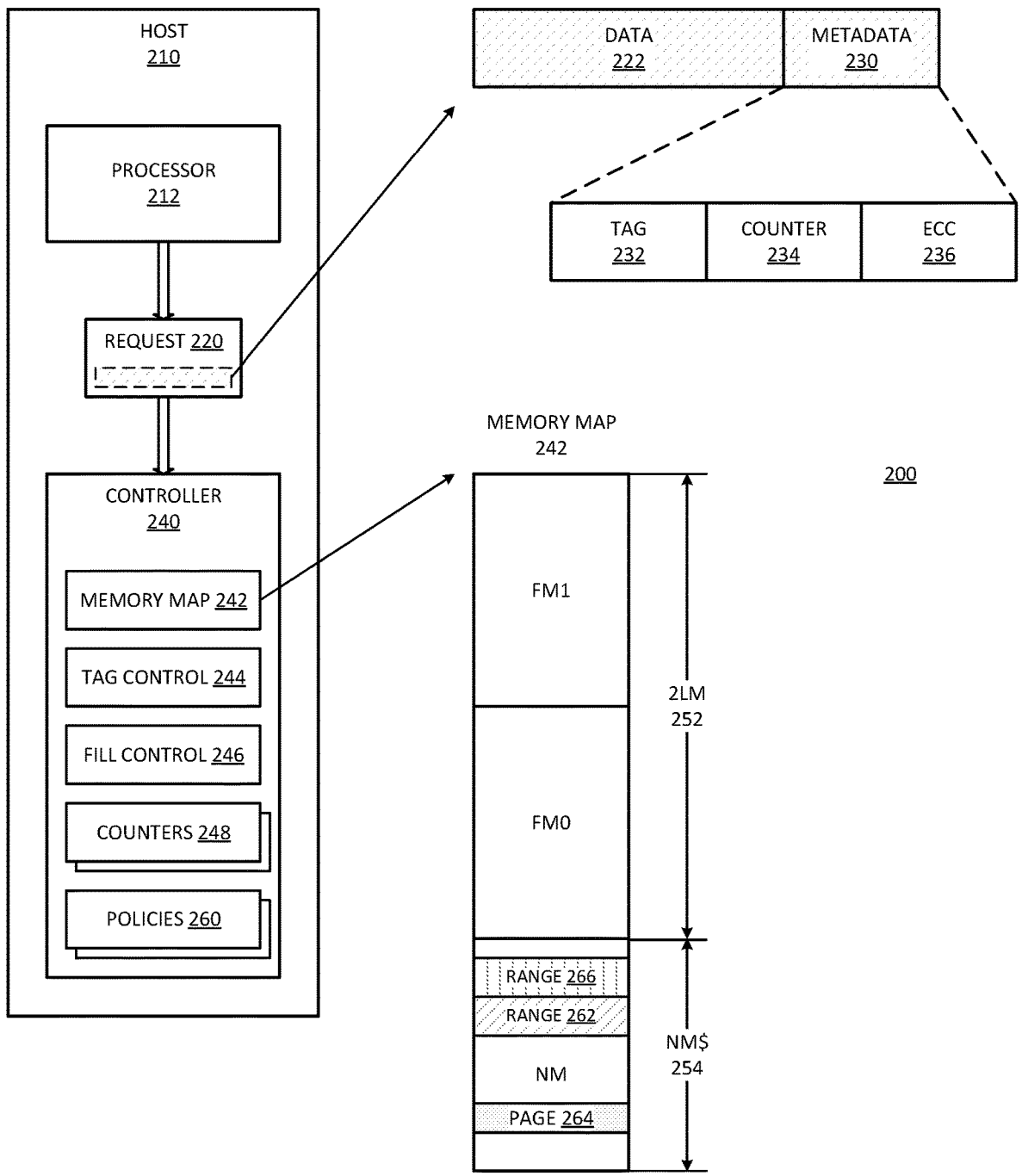
FIG. 2 is a block diagram of an example of a system for 2LM management.

FIG. 2 is a block diagram of an example of a system for 2LM management. System 200 represents a system in accordance with an example of system 100. Host 210 represents a host hardware platform, which can include an SOC. System 200 does not illustrate specific elements including processing components in detail.

Host 210 includes processor 212, which executes a host operating system (not specifically illustrated). The host OS or an application executing on processor 212 can generate a request for data. Request 220 represents the request passed from software components executed by processor 212 to controller 240, which manages access to system memory.

System 200 illustrates the memory resources from the perspective of memory map 242. Memory map 242 represents a view of the memory resources that software of host 210 can see and that controller 240 manages. The memory resources can include a near memory (NM) resource mapped as a near memory cache, represented as NM$ 254. NM can include one or more memory devices or resources. In one example, NM includes native DDR (double data rate) volatile memory, referring to memory devices connected to a system bus of host 210.

The memory resources can include one or more far memory (FM) resources mapped as secondary memory, represented as 2LM 252, referring to a second level memory region. 2LM 252 can include volatile or nonvolatile memory, connected through a network link. System 200 illustrates 2LM 252 with FM0 and FM1, representing, respectively, first and second far memory resources. In one example, the capacity of FM is the same as the capacity of NM. In one example, FM has more memory capacity than NM. In one example, there is only one FM region to pair to the NM region. A region of memory refers to an address space, and different regions of 2LM memory refer to different links to access the address space.

In one example, the first level memory and the second level memory are exposed to the host OS in a flat manner. In one example, controller 240 performs data movement and management of system memory in cacheline granularity. For a cache set in first level memory, there are cachelines that are set aliases in the second level memory that are allocated to the cache set.

System 200 does not explicitly show the alias cachelines or memory portions in the 2LM region of system memory. With a flat memory configuration, a cacheline will be stored in either the 2LM region (2LM 252) or the NM cache (NM$ 254), with alias cachelines in the other memory region. Read and write access time to NM$ 254 is faster than access to 2LM 252. Based on the number of accesses to a cacheline and a swap policy for the memory region associated with the cacheline. The number of accesses indicates whether the data is "hot data" or indicates how hot the requested data is. The swap policy indicates that factors other than access count can be considered in determining whether to swap data between FM and NM. When controller 240 determines to swap the cacheline, controller 240 can transfer data between NM$ 254 and 2LM 252. The data swap can be at the cacheline granularity, at the level of one or more blocks of data, at the level of pages, or other amount of data.

In one example, request 220 is related to a cacheline or other segment of memory requested. System 200 represents the segment of memory requested as having data 222, which is the primary data, and metadata 230. Metadata 230 includes tag and other information for data 222. In one example, metadata 230 includes tag 232, counter 234, and ECC (error correction code) 236, which represents ECC information for error checking and correction.

In one example, controller 240 uses tag 232 to determine whether the cacheline of request 220 is stored in NM$ 254 or 2LM 252. Tag control 244 represents logic in controller 240 to enable the controller to decode the tag information and locate the requested data in memory map 242. Tag control 244 is typically implemented in circuitry that performs tag comparison to determine if there is a cache hit.

In one example, the data of request 220 includes counter 234, which can represent an access counter. In one example, controller increments counter 234 on every memory access to the cacheline in NM$ 254 and decrements counter 234 on every memory access to an alias cacheline to 2LM 252. In one example, controller 240 maintains one or more counters 248 to track access to a portion of memory different than a cacheline or the size of a memory access request.

In one example, controller 240 uses the value or number in counter 234 to determine when to swap a cacheline into NM$ 254 from 2LM 252. The value of counter 234 can indicate whether the cacheline in the first level memory is hotter (i.e., the number of accesses is greater) than the corresponding aliased cachelines in the second level memory. If the cacheline in NM$ 254 is less hot (i.e., the number of accesses is less) than the corresponding aliased cachelines in 2LM 252, in one example, controller will perform a swap of the data or a swap of the cacheline. In one example, in addition to the number of accesses, controller 240 can consider hints from the host OS and a swap policy associated with the cacheline or an address region associated with the cacheline.

In one example, controller 240 includes fill control 246 to manage filling NM$ 254 or swapping data from 2LM 252 to NM$ 254. In a typical 2LM operation, controller 240 through tag control 244 can identify tag 232 and determine if there is a hit in NM$ 254. If there is a miss in near memory, controller 240 accesses the data from far memory and fills near memory by putting the data in NM$ 254.

In system 200, instead of always filling NM$ 254, fill control 246 can determine whether to perform a swap based on a policy associated with a region associated with the data requested. When controller 240 determines not to perform a swap, it can obtain the data from 2LM 252 and send it back to the requester (i.e., the application or program or agent that triggered request 220). However, instead of filling the data into NM$ 254, controller 240 does not swap data between 2LM 252 and NM$ 254.

In one example, controller 240 maintains policies 260 to identify swap policies for different memory regions. The swap policies can indicate how aggressively controller 240 should fill the region on a cache miss. In one example, fill control 246 checks policies 260 for a swap policy for a region associated with an address of request 220 to determine whether to perform a swap.

In system 200, the use of counter 234 in metadata 230 can enable controller 240 to selectively fill NM$ 254 based on an access threshold. The application of policies 260 can enable controller 240 to determine when to allocate data to NM$ 254 based on access threshold and when to allocate based on other metrics in addition to or instead of counter 234.

Where counter 234 applies to the data of a request, the access threshold would apply to all of 2LM 252. Policies 260 enables controller 240 to have control over specific ranges. In one example, controller 240 can apply different thresholds to different ranges of NM$ 254 based on policies 260. Thus, controller 240 can apply access thresholds, but at different thresholds for different regions. The ability to apply different policies 260 to different regions of memory enables controller 240 to address the runtime needs of individual virtual machines (VMs) or individual applications executed by host 210.

In one example, policies 260 are based on an address range, such as range 262. Range 262 represents a defined range of address space, with a starting address and an ending address. The space within the range can be the region. While only one region is illustrated in system 200, controller 240 can break the entire address range into multiple regions. Controller 240 can tag each region to follow either a default or normal 2LM fill/evict flow, or a specific fill policy. For purposes of description here, consider the specific fill policy to be a "no-fill" policy that identifies different fill/evict behaviors based on region.

The no-fill policy can make a particular region a flat space where the hardware (e.g., controller 240) will not perform standard hardware cacheline data management or standard 2LM flows. In such an implementation, software executing on processor 212 can use such regions (such as range 262) to run 2LM unfriendly workloads in a region of NM$ 254, or to do page-level data management (e.g., in page 264).

In one example, the use of such regions enables system 200 to assign 2LM regions to certain VMs and 1LM-only regions to cache-unfriendly VMs. Consider that range 262 represents a region that is a 1LM-only region for cache-unfriendly applications, and that range 266 represents a region that is a 2LM region. The host application or controller 240 can assign the cache-unfriendly VMs only to range 262. Other VMs that can tolerate the use of 2LM can be assigned to range 266 and will not be assigned to range 262.

In one example, the specific fill policy or the "no-fill" policy can be implemented as a selection of one of a group of fill policies. The fill policies can be assigned based on the value of a policy field. While there can be any number of implementations, one implementation can include the use of three different policies, which could be identified from a two-bit field. The policies can include a 2LM policy or a full swap policy, a lazy fill policy, and a no swap policy.

In one example, a full swap policy can be indicated as a "nofill='00'". A full swap policy can refer to a policy where, in response to a cache miss, controller 240 will fill and evict based on a selective fill threshold. A region assigned a full swap policy can be considered by software as a regular 2LM region. In one example, in response to a cache miss with a full swap policy, controller 240 will swap an entire portion of memory In one example, a lazy fill swap policy can be indicated as a "nofill='01'", to convert a memory region from a 2LM space to a 1LM space. A lazy fill swap policy can refer to a policy where, in response to a cache miss, controller 240 will fill and evict based on whether NM$ 254 has a home address of the requested data. If the home address is not in NM$ 254, controller 240 can perform a swap (i.e., a fill and evict), and not perform a swap if NM$ 254 has the home address. Such a swap policy can enable the host software to convert a region from 2LM to 1LM, swapping the entire region, but only portion by portion or cacheline by cacheline as the system makes access requests for the data in the region.

In one example, a no swap policy can be indicated as a "nofill='11'". A no swap policy can refer to a policy where controller 240 does not perform fill or evict from the region. Controller 240 can execute home-address transactions from NM$ 254 and non-home address transactions from FM (2LM 252). In one example, host software can apply such a policy or mode when the software manages to flush the region and expects to use the region as a 1LM space. Thus, such a policy can be applied to manage a 2LM to 1LM migration.

In one example, policies 260 are based on physical page, such as page 264. Page 264 can represent a unit data that will be involved in a swap. In one example, page 264 represents multiple units of data 222. In one example, not all pages have a specific swap policy. Controller 240 can have a default or generic swap policy, and then assign specific swap policies for selected pages.

In one example, the software executed by host 210 can determine and tag any physical page as being "pinned" or placed in NM. In one example, the software can pin a physical page by setting a bit in the page table. In one example, when request 220 passes outside the processor core (e.g., outside the core and lower levels of processor cache) to uncore components (e.g., last level cache or any other component outside the processor core), the request can include the bit to indicate the page is to be pinned. In one example, based on the bit value, controller can perform a 2LM fill selectively, performing a fill and evict operation for physical pages that do not have the bit set. For pages that have the bit set, such as page 264, controller 240 can leave the page in NM$ 254. Thus, the host OS or an application through the host OS can place selected "important" pages in NM$ 254 and ensure controller 240 does not swap the page out.

Typically, management of the fill policy based on address range is easier to implement in the hardware (e.g., controller 240). The use of such address ranges can require more effort from the software. When management of the fill policy is based on physical page based on an indicator in the page table, such a policy can be easier to implement in software.

In one example, controller 240 includes counters 248, which can represent counters to manage access count or miss count per region. In one example, counters 248 can be based on memory access, and controller 240 can increment the counter based on access. In one example, counters 248 can be based on cache misses, and controller 240 can increment counters 248 based on cache misses. In one example, counters 248 are registers or counters accessible to system software, which the software can use to characterize 2LM region performance during runtime.

In one example, counters 248 represent leaky bucket counters in the 2LM controller. Counters 248 can count the number of misses, incrementing per cache miss for the region, and decrementing based on a programmable time window. In one example, the leaky bucket counter has a programmable time window and numbers of 8-bit counters. Each counter can represent the miss counts for each of the sub regions of memory, where the leaky bucket time window can be computed based on a base for the counter ("MissCounterBase") and a multiplier for the counter ("MissCounterMul").

One specific example of the window size could then be defined as: window size=2^(MissCounterBase) X MissCounterMul. Controller 240 can increment the counter whenever there is a miss in the corresponding region and decrement the counter when the leaky bucket window expires (i.e., counting down from the window size). In one example, if a counter reaches the counter maximum value (e.g., 255 or 0xFFh for an 8-bit counter) within the time window, controller 240 will stop incrementing the counter. Software can monitor the counters. Typically, for a region whose cache miss counter maxes out, the software can clear the counter and determine to use the memory region differently (e.g., evict it in favor of a hotter region of memory).

Figure 3:
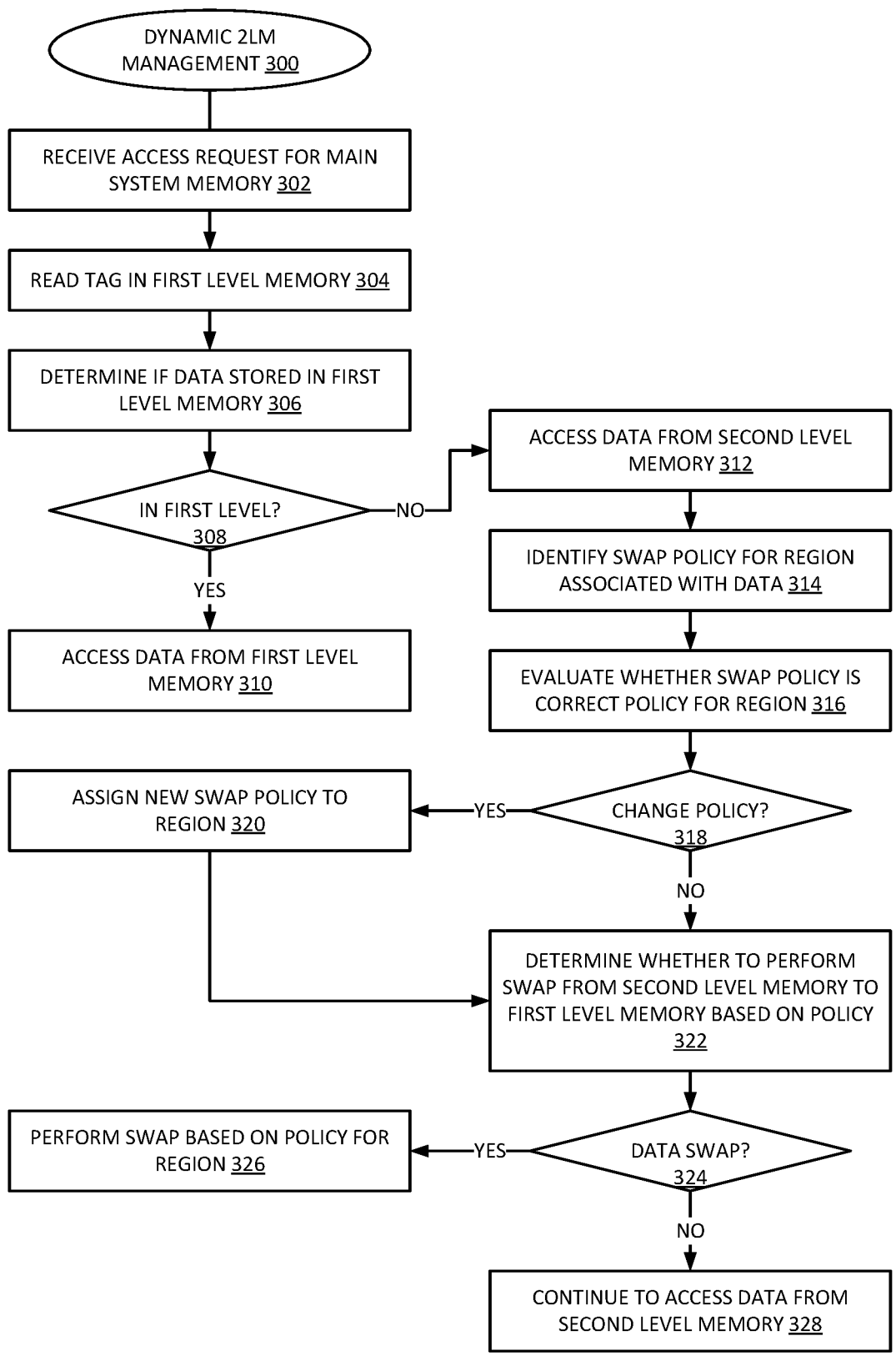
FIG. 3 is a flow diagram of an example of a process for managing multilevel memory.

FIG. 3 is a flow diagram of an example of a process for managing multilevel memory. Process 300 represents a process for dynamic management of 2LM memory usage. Process 300 can represent a process applied by an example of system 100 or system 200.

In one example, a cache controller or memory controller of a system with 2LM memory receives an access request for main system memory, at 302. The main system memory can include a region managed as a 1LM region or a near memory cache, as well as a region managed as a 2LM region. The controller can read the tag information for the first level memory, at 304.

The controller can determine if the requested data is stored in the first level memory, at 306. If the data is in the first level memory, at 308 YES branch, the controller can access the data from the first level memory, at 310. If the data is not in the first level memory, at 308 NO branch, the controller can access the data from the second level memory, at 312.

In one example, the controller identifies a swap policy for a memory region associated with the address of the requested data, at 314. The controller or the system software can determine whether the swap policy for the region is the correct policy, at 316. Such an evaluation can enable the system to respond to realtime needs of the workloads being executed in the system.

If the system determines to change the policy, at 318 YES branch, the controller can assign a new swap policy to the region, at 320. If the system determines not to change the policy, at 318 NO branch, or after changing to a new policy, at 320, the controller can determine whether to perform a data swap from the second level memory to the first level memory based on the policy, at 322.

It will be understood that the evaluation of the policy and the setting of the policy to a new policy can be performed in parallel to the determination of whether to perform a swap based on the policy. Process 300 includes the "new policy" assignment operations to illustrate the ability of the system to dynamically adapt swap policies per region based on runtime performance of the system. The swap policy can be any swap policy described herein, or other swap policies that allow for dynamic management of 2LM and 1LM regions of a 2LM memory architecture.

If the controller determines to perform a data swap, at 324 YES branch, the controller perform a data swap with a fill and evict based on the policy for the region, at 326. If the controller determines not to perform a data swap, at 324 NO branch, the controller continues to access data from the second level memory and drops the fill and evict operations, at 328.

Figure 4:
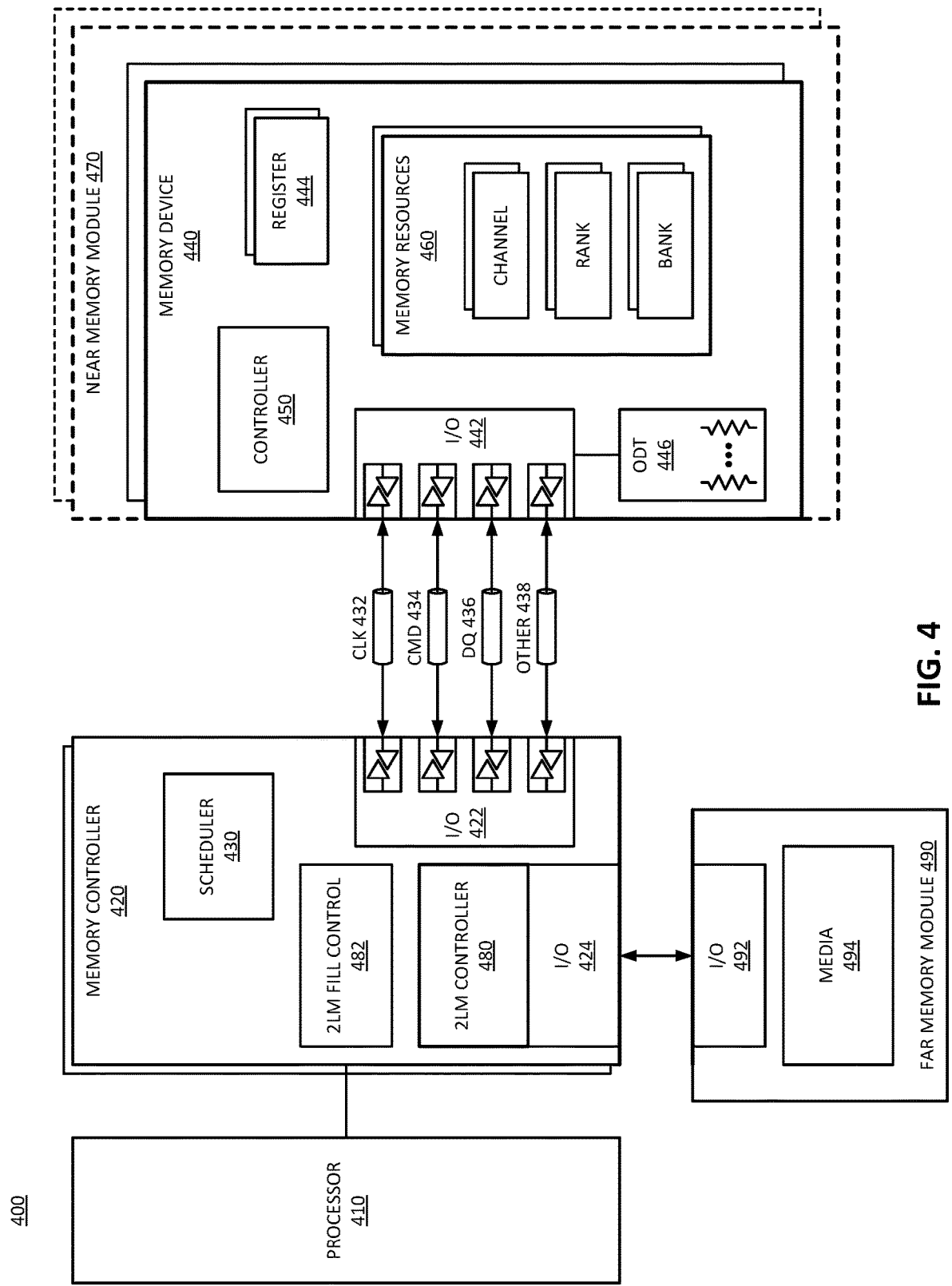
FIG. 4 is a block diagram of an example of a memory subsystem in which multilevel memory management can be implemented.

FIG. 4 is a block diagram of an example of a memory subsystem in which multilevel memory management can be implemented. System 400 includes a processor and elements of a memory subsystem in a computing device. System 400 represents a system in accordance with an example of system 100 or system 200.

System 400 can operate as a dynamic 2LM system with far memory module 490 having a longer access delay than near memory module 470. In one example, memory controller 420 includes 2LM controller 480. Far memory module 490 includes I/O 492 to interface with I/O 424. Far memory module 490 includes media 494, which represents the storage media of module 490. In one example, media 494 is nonvolatile media. In one example, media 494 can include volatile memory media.

2LM controller 480 can access far memory module 490 via I/O (input/output) 424, which can be or include CXL links and associated controllers. In one example, 2LM controller 480 is a subset of scheduler 430. In one example, memory controller 420 includes 2LM fill control 482, which represents logic to dynamically manage 1LM and 2LM memory space based on a fill policy or a swap policy per memory region. The memory region can be a physical page or can be an address range. The management of fill by region can be in accordance with any example herein.

Processor 410 represents a processing unit of a computing platform that may execute an operating system (OS) and applications, which can collectively be referred to as the host or the user of the memory. The OS and applications execute operations that result in memory accesses. Processor 410 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 400 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (double data rate version 4, JESD79-4, originally published in September 2012 by JEDEC (Joint Electron Device Engineering Council, now the JEDEC Solid State Technology Association), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, JESD79-5, originally published by JEDEC in July 2020), LPDDR5 (LPDDR version 5, JESD209-5, originally published by JEDEC in February 2019), HBM2 ((HBM version 2), currently in discussion by JEDEC), or others or combinations of memory technologies, and technologies based on derivatives or extensions of such specifications.

Memory controller 420 represents one or more memory controller circuits or devices for system 400. Memory controller 420 represents control logic that generates memory access commands in response to the execution of operations by processor 410. Memory controller 420 accesses one or more memory devices 440. Memory devices 440 can be DRAM devices in accordance with any referred to above. In one example, memory devices 440 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 420 manages a separate memory channel, although system 400 can be configured to have multiple channels managed by a single controller, or to have multiple controllers on a single channel. In one example, memory controller 420 is part of host processor 410, such as logic implemented on the same die or implemented in the same package space as the processor.

Memory controller 420 includes I/O interface logic 422 to couple to a memory bus, such as a memory channel as referred to above. I/O interface logic 422 (as well as I/O interface logic 442 of memory device 440) can include pins, pads, connectors, signal lines, traces, or wires, or other hardware to connect the devices, or a combination of these. I/O interface logic 422 can include a hardware interface. As illustrated, I/O interface logic 422 includes at least drivers/transceivers for signal lines. Commonly, wires within an integrated circuit interface couple with a pad, pin, or connector to interface signal lines or traces or other wires between devices. I/O interface logic 422 can include drivers, receivers, transceivers, or termination, or other circuitry or combinations of circuitry to exchange signals on the signal lines between the devices. The exchange of signals includes at least one of transmit or receive. While shown as coupling I/O 422 from memory controller 420 to I/O 442 of memory device 440, it will be understood that in an implementation of system 400 where groups of memory devices 440 are accessed in parallel, multiple memory devices can include I/O interfaces to the same interface of memory controller 420. In an implementation of system 400 including one or more memory modules 470, I/O 442 can include interface hardware of the memory module in addition to interface hardware on the memory device itself. Other memory controllers 420 will include separate interfaces to other memory devices 440.

The bus between memory controller 420 and memory devices 440 can be implemented as multiple signal lines coupling memory controller 420 to memory devices 440. The bus may typically include at least clock (CLK) 432, command/address (CMD) 434, and write data (DQ) and read data (DQ) 436, and zero or more other signal lines 438. In one example, a bus or connection between memory controller 420 and memory can be referred to as a memory bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 400 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 420 and memory devices 440. An example of a serial bus technology is 86106 encoding and transmission of high-speed data with embedded clock over a single differential pair of signals in each direction. In one example, CMD 434 represents signal lines shared in parallel with multiple memory devices. In one example, multiple memory devices share encoding command signal lines of CMD 434, and each has a separate chip select (CS_n) signal line to select individual memory devices.

It will be understood that in the example of system 400, the bus between memory controller 420 and memory devices 440 includes a subsidiary command bus CMD 434 and a subsidiary bus to carry the write and read data, DQ 436. In one example, the data bus can include bidirectional lines for read data and for write/command data. In another example, the subsidiary bus DQ 436 can include unidirectional write signal lines for write and data from the host to memory, and can include unidirectional lines for read data from the memory to the host. In accordance with the chosen memory technology and system design, other signals 438 may accompany a bus or sub bus, such as strobe lines DQS. Based on design of system 400, or implementation if a design supports multiple implementations, the data bus can have more or less bandwidth per memory device 440. For example, the data bus can support memory devices that have either a x32 interface, a x16 interface, a x8 interface, or other interface. The convention "xW," where W is an integer that refers to an interface size or width of the interface of memory device 440, which represents a number of signal lines to exchange data with memory controller 420. The interface size of the memory devices is a controlling factor on how many memory devices can be used concurrently per channel in system 400 or coupled in parallel to the same signal lines. In one example, high bandwidth memory devices, wide interface devices, or stacked memory configurations, or combinations, can enable wider interfaces, such as a x128 interface, a x256 interface, a x512 interface, a x1024 interface, or other data bus interface width.

In one example, memory devices 440 and memory controller 420 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length 8 (BL8), and each memory device 440 can transfer data on each UI. Thus, a x8 memory device operating on BL8 can transfer 44 bits of data (8 data signal lines times 8 data bits transferred per line over the burst). It will be understood that this simple example is merely an illustration and is not limiting.

Memory devices 440 represent memory resources for system 400. In one example, each memory device 440 is a separate memory die. In one example, each memory device 440 can interface with multiple (e.g., 2) channels per device or die. Each memory device 440 includes I/O interface logic 442, which has a bandwidth determined by the implementation of the device (e.g., x16 or x8 or some other interface bandwidth). I/O interface logic 442 enables the memory devices to interface with memory controller 420. I/O interface logic 442 can include a hardware interface, and can be in accordance with I/O 422 of memory controller, but at the memory device end. In one example, multiple memory devices 440 are connected in parallel to the same command and data buses. In another example, multiple memory devices 440 are connected in parallel to the same command bus, and are connected to different data buses. For example, system 400 can be configured with multiple memory devices 440 coupled in parallel, with each memory device responding to a command, and accessing memory resources 460 internal to each. For a Write operation, an individual memory device 440 can write a portion of the overall data word, and for a Read operation, an individual memory device 440 can fetch a portion of the overall data word. As non-limiting examples, a specific memory device can provide or receive, respectively, 8 bits of a 128-bit data word for a Read or Write transaction, or 8 bits or 16 bits (depending for a x8 or a x16 device) of a 256-bit data word. The remaining bits of the word will be provided or received by other memory devices in parallel.

In one example, memory devices 440 are disposed directly on a motherboard or host system platform (e.g., a PCB (printed circuit board) on which processor 410 is disposed) of a computing device. In one example, memory devices 440 can be organized into memory modules 470. In one example, memory modules 470 represent dual inline memory modules (DIMMs). In one example, memory modules 470 represent other organization of multiple memory devices to share at least a portion of access or control circuitry, which can be a separate circuit, a separate device, or a separate board from the host system platform. Memory modules 470 can include multiple memory devices 440, and the memory modules can include support for multiple separate channels to the included memory devices disposed on them. In another example, memory devices 440 may be incorporated into the same package as memory controller 420, such as by techniques such as multi-chip-module (MCM), package-on-package, through-silicon via (TSV), or other techniques or combinations. Similarly, in one example, multiple memory devices 440 may be incorporated into memory modules 470, which themselves may be incorporated into the same package as memory controller 420. It will be appreciated that for these and other implementations, memory controller 420 may be part of host processor 410.

Memory devices 440 each include memory resources 460. Memory resources 460 represent individual arrays of memory locations or storage locations for data. Typically memory resources 460 are managed as rows of data, accessed via wordline (rows) and bitline (individual bits within a row) control. Memory resources 460 can be organized as separate channels, ranks, and banks of memory. Channels may refer to independent control paths to storage locations within memory devices 440. Ranks may refer to common locations across multiple memory devices (e.g., same row addresses within different devices). Banks may refer to arrays of memory locations within a memory device 440. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 440 include one or more registers 444. Register 444 represents one or more storage devices or storage locations that provide configuration or settings for the operation of the memory device. In one example, register 444 can provide a storage location for memory device 440 to store data for access by memory controller 420 as part of a control or management operation. In one example, register 444 includes one or more Mode Registers. In one example, register 444 includes one or more multipurpose registers. The configuration of locations within register 444 can configure memory device 440 to operate in different "modes," where command information can trigger different operations within memory device 440 based on the mode. Additionally or in the alternative, different modes can also trigger different operation from address information or other signal lines depending on the mode. Settings of register 444 can indicate configuration for I/O settings (e.g., timing, termination or ODT (on-die termination) 446, driver configuration, or other I/O settings).

In one example, memory device 440 includes ODT 446 as part of the interface hardware associated with I/O 442. ODT 446 can be configured as mentioned above, and provide settings for impedance to be applied to the interface to specified signal lines. In one example, ODT 446 is applied to DQ signal lines. In one example, ODT 446 is applied to command signal lines. In one example, ODT 446 is applied to address signal lines. In one example, ODT 446 can be applied to any combination of the preceding. The ODT settings can be changed based on whether a memory device is a selected target of an access operation or a non-target device. ODT 446 settings can affect the timing and reflections of signaling on the terminated lines. Careful control over ODT 446 can enable higher-speed operation with improved matching of applied impedance and loading. ODT 446 can be applied to specific signal lines of I/O interface 442, 422, and is not necessarily applied to all signal lines.

Memory device 440 includes controller 450, which represents control logic within the memory device to control internal operations within the memory device. For example, controller 450 decodes commands sent by memory controller 420 and generates internal operations to execute or satisfy the commands. Controller 450 can be referred to as an internal controller, and is separate from memory controller 420 of the host. Controller 450 can determine what mode is selected based on register 444, and configure the internal execution of operations for access to memory resources 460 or other operations based on the selected mode. Controller 450 generates control signals to control the routing of bits within memory device 440 to provide a proper interface for the selected mode and direct a command to the proper memory locations or addresses. Controller 450 includes command logic to decode command encoding received on command and address signal lines. Controller can identify commands and generate internal operations to execute requested commands.

Referring again to memory controller 420, memory controller 420 includes command logic to generate commands to send to memory devices 440. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 440, memory controller 420 can issue commands via I/O 422 to cause memory device 440 to execute the commands. In one example, controller 450 of memory device 440 receives and decodes command and address information received via I/O 442 from memory controller 420. Based on the received command and address information, controller 450 can control the timing of operations of the logic and circuitry within memory device 440 to execute the commands. Controller 450 is responsible for compliance with standards or specifications within memory device 440, such as timing and signaling requirements. Memory controller 420 can implement compliance with standards or specifications by access scheduling and control.

Memory controller 420 includes scheduler 430, which represents logic or circuitry to generate and order transactions to send to memory device 440. From one perspective, the primary function of memory controller 420 could be said to schedule memory access and other transactions to memory device 440. Such scheduling can include generating the transactions themselves to implement the requests for data by processor 410 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 420 typically includes logic such as scheduler 430 to allow selection and ordering of transactions to improve performance of system 400. Thus, memory controller 420 can select which of the outstanding transactions should be sent to memory device 440 in which order, which is typically achieved with logic much more complex that a simple first-in first-out algorithm. Memory controller 420 manages the transmission of the transactions to memory device 440, and manages the timing associated with the transaction. In one example, transactions have deterministic timing, which can be managed by memory controller 420 and used in determining how to schedule the transactions with scheduler 430.

Figure 5:
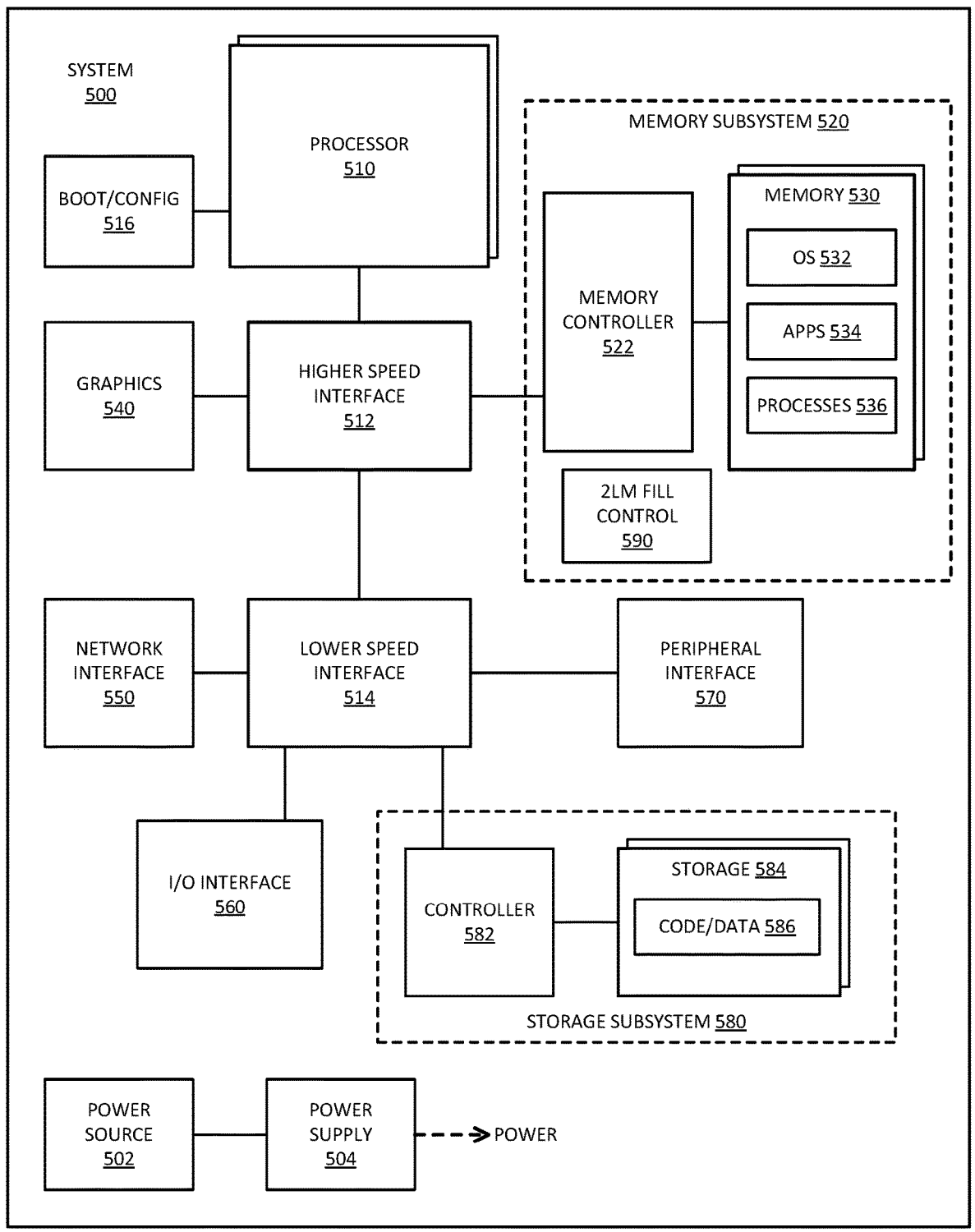
FIG. 5 is a block diagram of an example of a computing system in which multilevel memory management can be implemented.

FIG. 5 is a block diagram of an example of a computing system in which multilevel memory management can be implemented. System 500 represents a computing device in accordance with any example herein, and can be a laptop computer, a desktop computer, a tablet computer, a server, a gaming or entertainment control system, embedded computing device, or other electronic device.

System 500 represents a system in accordance with an example of system 100 or an example of system 200. In one example, memory subsystem 520 includes 2LM fill control 590, which represents logic to dynamically manage 1LM and 2LM memory space based on a fill policy or a swap policy per memory region. The memory region can be a physical page or can be an address range. The management of fill by region can be in accordance with any example herein.

System 500 includes processor 510 can include any type of microprocessor, central processing unit (CPU), graphics processing unit (GPU), processing core, or other processing hardware, or a combination, to provide processing or execution of instructions for system 500. Processor 510 can be a host processor device. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or a combination of such devices.

System 500 includes boot/config 516, which represents storage to store boot code (e.g., basic input/output system (BIOS)), configuration settings, security hardware (e.g., trusted platform module (TPM)), or other system level hardware that operates outside of a host OS. Boot/config 516 can include a nonvolatile storage device, such as read-only memory (ROM), flash memory, or other memory devices.

In one example, system 500 includes interface 512 coupled to processor 510, which can represent a higher speed interface or a high throughput interface for system components that need higher bandwidth connections, such as memory subsystem 520 or graphics interface components 540. Interface 512 represents an interface circuit, which can be a standalone component or integrated onto a processor die. Interface 512 can be integrated as a circuit onto the processor die or integrated as a component on a system on a chip. Where present, graphics interface 540 interfaces to graphics components for providing a visual display to a user of system 500. Graphics interface 540 can be a standalone component or integrated onto the processor die or system on a chip. In one example, graphics interface 540 can drive a high definition (HD) display or ultra high definition (UHD) display that provides an output to a user. In one example, the display can include a touchscreen display. In one example, graphics interface 540 generates a display based on data stored in memory 530 or based on operations executed by processor 510 or both.

Memory subsystem 520 represents the main memory of system 500, and provides storage for code to be executed by processor 510, or data values to be used in executing a routine. Memory subsystem 520 can include one or more varieties of random-access memory (RAM) such as DRAM, 3DXP (three-dimensional crosspoint), or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510, such as integrated onto the processor die or a system on a chip.

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 500 includes interface 514, which can be coupled to interface 512. Interface 514 can be a lower speed interface than interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can exchange data with a remote device, which can include sending data stored in memory or receiving data to be stored in memory.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, NAND, 3DXP, or optical based disks, or a combination. Storage 584 holds code or instructions and data 586 in a persistent state (i.e., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (i.e., the value or state of the data is indeterminate if power is interrupted to system 500). In one example, storage subsystem 580 includes controller 582 to interface with storage 584. In one example controller 582 is a physical part of interface 514 or processor 510, or can include circuits or logic in both processor 510 and interface 514.

Power source 502 provides power to the components of system 500. More specifically, power source 502 typically interfaces to one or multiple power supplies 504 in system 500 to provide power to the components of system 500. In one example, power supply 504 includes an AC to DC (alternating current to direct current) adapter to plug into a wall outlet. Such AC power can be renewable energy (e.g., solar power) power source 502. In one example, power source 502 includes a DC power source, such as an external AC to DC converter. In one example, power source 502 or power supply 504 includes wireless charging hardware to charge via proximity to a charging field. In one example, power source 502 can include an internal battery or fuel cell source.

Figure 6:
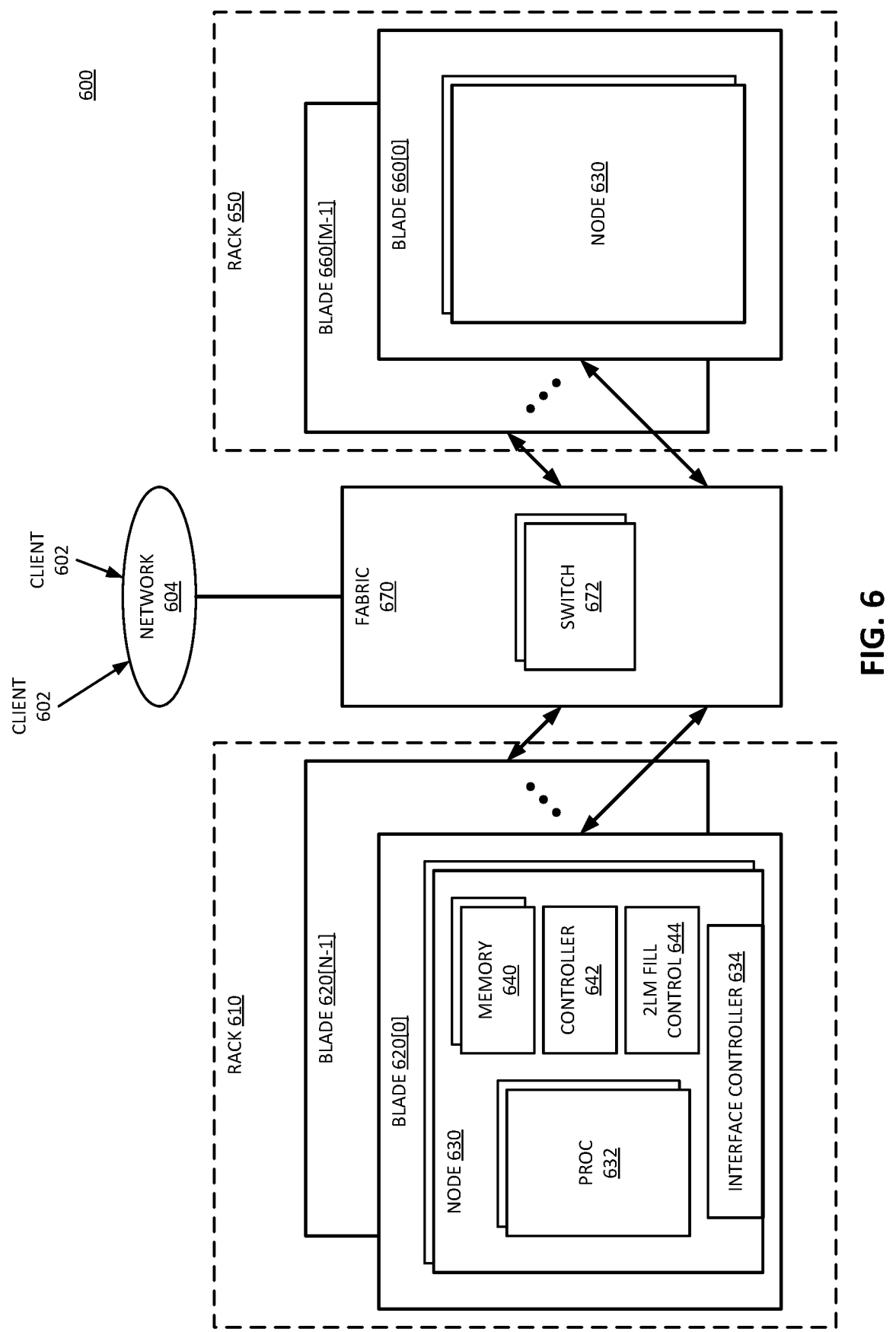
FIG. 6 is a block diagram of an example of a multi-node network in which multilevel memory management can be implemented.

FIG. 6 is a block diagram of an example of a multi-node network in which multilevel memory management can be implemented. System 600 represents a network of nodes that can apply adaptive ECC. In one example, system 600 represents a data center. In one example, system 600 represents a server farm. In one example, system 600 represents a data cloud or a processing cloud.

Node 630 represents a system in accordance with an example of system 100 or an example of system 200. In one example, node 630 includes access to 1LM and 2LM memory resources. Memory 640 can represent both the 1LM and 2LM memory. Controller 642 represents a memory controller or other controller to access the memory resources. In one example, node 630 includes 2LM fill control 644, which represents logic to dynamically manage 1LM and 2LM memory space based on a fill policy or a swap policy per memory region. The memory region can be a physical page or can be an address range. The management of fill by region can be in accordance with any example herein.

One or more clients 602 make requests over network 604 to system 600. Network 604 represents one or more local networks, or wide area networks, or a combination. Clients 602 can be human or machine clients, which generate requests for the execution of operations by system 600. System 600 executes applications or data computation tasks requested by clients 602.

In one example, system 600 includes one or more racks, which represent structural and interconnect resources to house and interconnect multiple computation nodes. In one example, rack 610 includes multiple nodes 630. In one example, rack 610 hosts multiple blade components 620. Hosting refers to providing power, structural or mechanical support, and interconnection. Blades 620 can refer to computing resources on printed circuit boards (PCBs), where a PCB houses the hardware components for one or more nodes 630. In one example, blades 620 do not include a chassis or housing or other "box" other than that provided by rack 610. In one example, blades 620 include housing with exposed connector to connect into rack 610. In one example, system 600 does not include rack 610, and each blade 620 includes a chassis or housing that can stack or otherwise reside in close proximity to other blades and allow interconnection of nodes 630.

System 600 includes fabric 670, which represents one or more interconnectors for nodes 630. In one example, fabric 670 includes multiple switches 672 or routers or other hardware to route signals among nodes 630. Additionally, fabric 670 can couple system 600 to network 604 for access by clients 602. In addition to routing equipment, fabric 670 can be considered to include the cables or ports or other hardware equipment to couple nodes 630 together. In one example, fabric 670 has one or more associated protocols to manage the routing of signals through system 600. In one example, the protocol or protocols is at least partly dependent on the hardware equipment used in system 600.

As illustrated, rack 610 includes N blades 620. In one example, in addition to rack 610, system 600 includes rack 650. As illustrated, rack 650 includes M blades 660. M is not necessarily the same as N; thus, it will be understood that various different hardware equipment components could be used, and coupled together into system 600 over fabric 670. Blades 660 can be the same or similar to blades 620. Nodes 630 can be any type of node and are not necessarily all the same type of node. System 600 is not limited to being homogenous, nor is it limited to not being homogenous.

For simplicity, only the node in blade 620[0] is illustrated in detail. However, other nodes in system 600 can be the same or similar. At least some nodes 630 are computation nodes, with processor (proc) 632 and memory 640. A computation node refers to a node with processing resources (e.g., one or more processors) that executes an operating system and can receive and process one or more tasks. In one example, at least some nodes 630 are server nodes with a server as processing resources represented by processor 632 and memory 640. A storage server refers to a node with more storage resources than a computation node, and rather than having processors for the execution of tasks, a storage server includes processing resources to manage access to the storage nodes within the storage server.

In one example, node 630 includes interface controller 634, which represents logic to control access by node 630 to fabric 670. The logic can include hardware resources to interconnect to the physical interconnection hardware. The logic can include software or firmware logic to manage the interconnection. In one example, interface controller 634 is or includes a host fabric interface, which can be a fabric interface in accordance with any example described herein.

Processor 632 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Node 630 can include memory devices represented by memory 640 and memory controller 642 to manage access to memory 640.

In general with respect to the descriptions herein, in one example an apparatus for memory management includes: a multilevel memory having a first level memory and a second level memory, the first level memory to cache data for the second level memory; and a memory controller coupled to the multilevel memory, the memory controller to detect a cache miss in the first level memory on a request for requested data from memory, and determine whether to perform a swap in response to the cache miss, to swap the requested data from the second level memory to the first level memory, based on a swap policy assigned to a memory region associated with an address for the requested data.

In one example of the apparatus, the memory region comprises an address range. In accordance with any preceding example of the apparatus, in one example, the memory region comprises a physical page. In accordance with any preceding example of the apparatus, in one example, the memory controller is to maintain an access counter per memory region to determine how hot the memory region, and wherein the memory controller is to swap the requested data from the second level memory to the first level memory based on the swap policy and how hot the memory region is. In accordance with any preceding example of the apparatus, in one example, the access counter comprises a leaky bucket counter per memory region, to increment for each cache miss within the memory region, and to decrement based on time. In accordance with any preceding example of the apparatus, in one example, the swap policy comprises a no swap policy to indicate no cache fill, preventing eviction from the first level memory for the memory region. In accordance with any preceding example of the apparatus, in one example, the swap policy comprises a full swap policy to indicate a swap of the requested data in response to the cache miss. In accordance with any preceding example of the apparatus, in one example, the swap policy comprises a lazy fill swap policy to indicate a swap of the memory region in response to the cache miss for the requested data, but only portion-by-portion as requests are made for portions of the memory region. In accordance with any preceding example of the apparatus, in one example, the first level memory comprises volatile memory and the second level memory comprises persistent memory.

In general with respect to the descriptions herein, in one example a computer system with memory management includes: a multilevel memory having a first level memory and a second level memory, the first level memory to cache data for the second level memory; a processor to execute a host operating system, the host operating system to generate a memory access request for requested data of memory stored in the multilevel memory; and a memory controller coupled to the multilevel memory and the processor, the memory controller to detect a cache miss in the first level memory in response to the memory access request, and determine whether to perform a swap in response to the cache miss, to swap the requested data from the second level memory to the first level memory, based on a swap policy assigned to a memory region associated with an address for the requested data.

In one example of the computer system, the memory region comprises an address range or a physical page. In accordance with any preceding example of the computer system, in one example, the memory controller is to maintain an access counter per memory region to determine how hot the memory region, and wherein the memory controller is to swap the requested data from the second level memory to the first level memory based on the swap policy and how hot the memory region is. In accordance with any preceding example of the computer system, in one example, the swap policy comprises a no swap policy to indicate no cache fill, preventing eviction from the first level memory for the memory region. In accordance with any preceding example of the computer system, in one example, the swap policy comprises a full swap policy to indicate a swap of the requested data in response to the cache miss. In accordance with any preceding example of the computer system, in one example, the swap policy comprises a lazy fill swap policy to indicate a swap of the memory region in response to the cache miss for the requested data, but only page-by-page as requests are made for pages of the memory region. In accordance with any preceding example of the computer system, in one example, the computer system includes one or more of: wherein the processor comprises a multicore processor; a display communicatively coupled to the host processor; a network interface communicatively coupled to the host processor.

In general with respect to the descriptions herein, in one example a method for memory management includes: receiving a memory access request for requested data of memory stored in a multilevel memory having a first level memory and a second level memory, the first level memory to cache data for the second level memory; detecting a cache miss in the first level memory in response to the memory access request; and determining whether to perform a swap in response to the cache miss, to swap the requested data from the second level memory to the first level memory, based on a swap policy assigned to a memory region associated with an address for the requested data.

In one example of the method, the memory region comprises an address range or a physical page. In accordance with any preceding example of the method, in one example the method includes, maintaining an access counter per memory region to determine how hot the memory region, and wherein swapping the requested data from the second level memory to the first level memory is based on the swap policy and how hot the memory region is, and wherein the access counter comprises a leaky bucket counter per memory region, to increment for each cache miss within the memory region, and to decrement based on time. In accordance with any preceding example of the method, in one example, performing the swap comprises selecting from among multiple swap policies, including a lazy fill swap policy to indicate a swap of the memory region in response to the cache miss for the requested data, but only cacheline by cacheline as requests are made for cachelines of the memory region.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus for memory management, comprising:
    a multilevel memory having a first level memory and a second level memory, the first level memory to cache data for the second level memory, the second level memory having an address space with multiple memory regions, with different swap policies assigned to different memory regions, where different swap policies define factors to determine when data in the second level memory is to be swapped with data in the first level memory, moving data from the second level memory into the first level memory, replacing data in the first level memory that is moved into the second level memory; and
    a memory controller coupled to the multilevel memory, the memory controller to detect a cache miss in the first level memory on a request for requested data, identify a specific memory region associated with an address of the requested data, and determine whether to swap the requested data from the second level memory to the first level memory in response to the cache miss, based on a swap policy assigned to the specific memory region.

2. The apparatus of claim 1, wherein the specific memory region comprises an address range.

3. The apparatus of claim 1, wherein the specific memory region comprises a physical page.

4. The apparatus of claim 1, wherein the memory controller is to maintain an access counter per memory region to determine how hot the memory region is, and wherein the memory controller is to swap the requested data from the second level memory to the first level memory based on the swap policy assigned to the specific memory region and how hot the memory region is.

5. The apparatus of claim 4, wherein the access counter comprises a leaky bucket counter per memory region, with a higher counter value to indicate a hotter memory region, the leaky bucket counter to increment for each cache miss within the memory region, and to decrement based on time.

6. The apparatus of claim 1, wherein the swap policy comprises a no swap policy to indicate no cache fill, preventing eviction from the first level memory for the specific memory region.

7. The apparatus of claim 1, wherein the swap policy comprises a full swap policy to indicate a swap of the requested data in response to the cache miss.

8. The apparatus of claim 1, wherein the swap policy comprises a lazy fill swap policy to indicate a swap of the specific memory region in response to the cache miss for the requested data, but only portion-by-portion as requests are made for portions of the specific memory region.

9. The apparatus of claim 1, wherein the first level memory comprises volatile memory and the second level memory comprises persistent memory.

10. A computer system with memory management, comprising:
    a multilevel memory having a first level memory and a second level memory, the first level memory to cache data for the second level memory, the second level memory having an address space with multiple memory regions, with different swap policies assigned to different memory regions, where different swap policies define factors to determine when data in the second level memory is to be swapped with data in the first level memory, moving data from the second level memory into the first level memory, replacing data in the first level memory that is moved into the second level memory;

a processor to execute a host operating system, the host operating system to generate a memory access request for requested data stored in the multilevel memory; and a memory controller coupled to the multilevel memory and the processor, the memory controller to detect a cache miss in the first level memory in response to the memory access request, identify a specific memory region associated with an address of the requested data, and determine whether to swap the requested data from the second level memory to the first level memory in response to the cache miss, based on a swap policy assigned to the specific memory region.

11. The computer system of claim 10, wherein the specific memory region comprises an address range or a physical page.

12. The computer system of claim 10, wherein the memory controller is to maintain an access counter per memory region to determine how hot the memory region is, and wherein the memory controller is to swap the requested data from the second level memory to the first level memory based on the swap policy assigned to the specific memory region and how hot the memory region is.

13. The computer system of claim 10, wherein the swap policy comprises a no swap policy to indicate no cache fill, preventing eviction from the first level memory for the specific memory region.

14. The computer system of claim 10, wherein the swap policy comprises a full swap policy to indicate a swap of the requested data in response to the cache miss.

15. The computer system of claim 10, wherein the swap policy comprises a lazy fill swap policy to indicate a swap of the specific memory region in response to the cache miss for the requested data, but only page-by-page as requests are made for pages of the specific memory region.

16. The computer system of claim 10, including one or more of:
wherein the processor comprises a multicore processor;
a display communicatively coupled to the processor; or
a network interface communicatively coupled to the processor.

17. A method for memory management, comprising:
receiving a memory access request for requested data stored in a multilevel memory having a first level memory and a second level memory, the first level memory to cache data for the second level memory, the second level memory having an address space with multiple memory regions, with different swap policies assigned to different memory regions, where different swap policies define factors to determine when data in the second level memory is to be swapped with data in the first level memory, moving data from the second level memory into the first level memory, replacing data in the first level memory that is moved into the second level memory;
detecting a cache miss in the first level memory in response to the memory access request;
identifying a specific memory region associated with an address of the requested data; and
determining whether to swap the requested data from the second level memory to the first level memory in response to the cache miss, based on a swap policy assigned to the specific memory region.

18. The method of claim 17, wherein the specific memory region comprises an address range or a physical page.

19. The method of claim 17, further comprising:
maintaining an access counter per memory region to determine how hot the memory region is, and wherein swapping the requested data from the second level memory to the first level memory is based on the swap policy assigned to the specific memory region and how hot the memory region is, and wherein the access counter comprises a leaky bucket counter per memory region, with a higher counter value to indicate a hotter memory region, the leaky bucket counter to increment for each cache miss within the memory region, and to decrement based on time.

20. The method of claim 17, wherein performing the swap comprises selecting from among multiple swap policies, including a lazy fill swap policy to indicate a swap of the specific memory region in response to the cache miss for the requested data, but only cacheline by cacheline as requests are made for cachelines of the specific memory region.

* * * * *